July 18, 1961 W. C. SWARTOUT 2,993,162

SUBHARMONIC GENERATOR CIRCUIT

Filed Sept. 12, 1958

WITNESSES

Bernard R. Gieguey

Leon J. Laga

INVENTOR

Willson C. Swartout

BY

Paul E. Friedemann

ATTORNEY

United States Patent Office 2,993,162

Patented July 18, 1961

2,993,162

SUBHARMONIC GENERATOR CIRCUIT

Willson C. Swartout, Lockport, N.Y., assignor to Westinghouse Electric Corporation, East Pittsburgh, Pa., a corporation of Pennsylvania Filed Sept. 12, 1958, Ser. No. 760,770
3 Claims. (Cl. 321—69)

This invention relates to circuitry involving recently devised semiconductor devices and more particularly to frequency converter circuitry, including semiconductor devices, for changing a relatively high frequency alternating current to a lower frequency of alternating current.

Frequency converters are known in the prior art but the circuitry involved is usually complex and expensive.

One broad object of this invention is the provision of a low frequency output from a higher frequency supply.

Another object of this invention is the provision of a circuit that is simple and inexpensive for the conversion of one frequency of alternating current voltage to a lower frequency of alternating current voltage.

A more specific object of this invention is the provision of circuitry for generating a subharmonic frequency from a normal supply frequency of alternating current, with the circuitry including a special type semiconductor diode having a controllable reversible breakdown characteristic. A semiconductor diode of the type herein mentioned is disclosed and claimed in the copending application of John Philips, Serial No. 642,743, filed February 27, 1957 and entitled, Semiconductor Diode, and now Patent No. 2,953,693.

Other objects and advantages of this invention will become more apparent from a study of the following specification and the accompanying drawing, in which.

Figure 1:
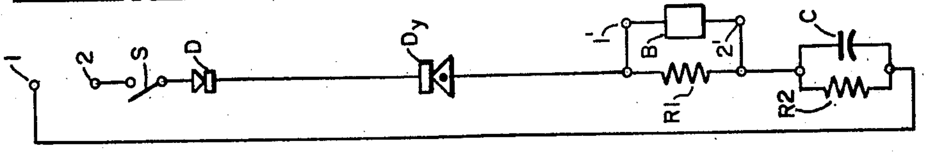
FIGURE 1 shows a simple loop circuit for producing subharmonic frequencies.

Referring to FIG. 1, terminals 1 and 2 represent the supply of a normal alternating current of say 60 cycles, 50 cycles, or any other conventional supply frequency, as for example 400 cycles, or may represent a supply of electrical pulses of any wave form and any selected frequency.

The loop circuit consists of a switch S, a conventional diode D, a special type semiconductor diode D*y*, a resistor R1, and a resistor R2 and a capacitor C connected in parallel to the resistor R2.

Figure 2:
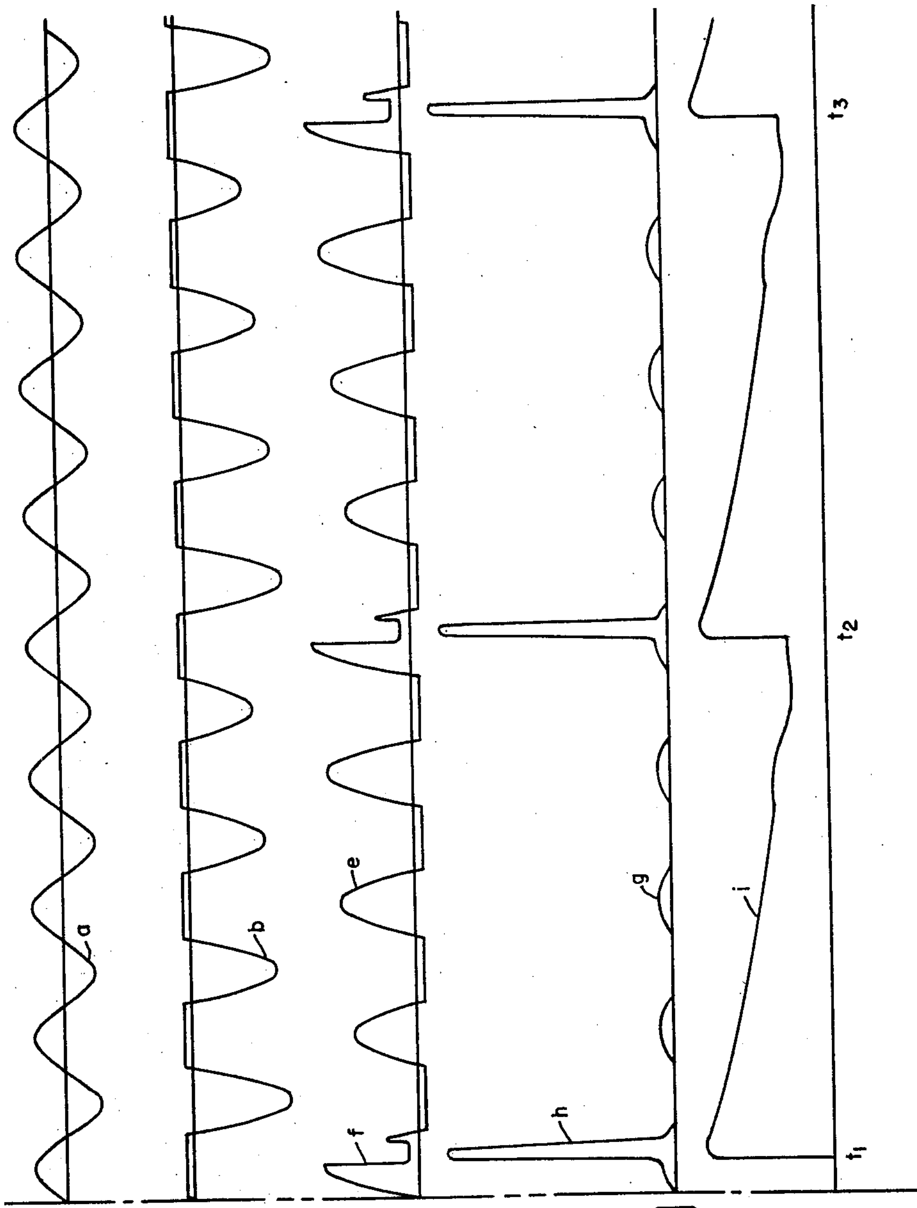
FIG. 2 shows curves illustrating the operating characteristics of the components of the circuit shown in FIG. 1.

Assuming the terminals 1 and 2 are energized with a conventional alternating current supply of 60 cycles. The voltage appearing at terminals 1 and 2 is represented by curve *a* shown in FIG. 2.

When the switch S is closed, voltage is supplied to the loop circuit. The voltage appearing at D is indicated by curve *b*, the voltage appearing at D*y* is indicated by curves *e* and *f*, the voltage appearing at R1 is indicated by curves *g* and *h*, and the voltage appearing on the load unit represented by resistor R2 is indicated by curve *i*. How this all comes about will become more apparent from a study of the operation of the circuit.

At the time switch S is closed, since there is no charge on the capacitor C, the capacitor C acts like a short circuit across R2. Substantially the full voltage of the supply thus appears across the semiconductor device D*y* and it breaks down showing the curve characteristic indicated at *f* of FIG. 2. The instant D*y* breaks down the voltage at R1 appears as the sharp spike *h*.

During the period of curve *h*, which may be roughly designated time $t_1$, the capacitor gets fully charged. When the capacitor is fully charged, the voltage at D*y* is insufficient to maintain it broken down and the voltage at D*y* goes through the change indicated by curve *f*. This is governed by the discharge characteristic, that is curve *i*, of the capacitor. At time $t_2$ the incoming voltage minus the voltage of the capacitor is equal to the breakdown voltage of the device D*y* and it breaks down and the cycle is repeated, and so on and on, at $t_2$, $t_3$, $t_4$, etc., producing a low frequency voltage on the resistor R2 indicated by the curve *i*.

While only one type of loop circuit is shown the invention is not limited to the exact arrangement of element, but other arrangements and the use of other elements in similar circuitry fall within the spirit and scope of this invention.

For example the invention is not limited to a single stage of frequency reduction but circuitry as shown may be connected in cascade to get still lower frequencies. This cascade connection is shown by the terminals 1′ and 2′ and block B connected across R1. The terminals 1′ and 2′ correspond to terminals 1 and 2 and block B corresponds to elements S, D, D*y*, R1, R2 and C. Of course, the circuit constants of the elements in block B must be properly selected to get the still lower frequency.

I claim as my invention:

1. In means for producing a low frequency alternating current from a higher frequency supply, in combination, a pair of terminals energized with alternating current of a selected supply frequency, a semiconductor diode having selected reversible breakdown characteristics and having a breakdown voltage less than the voltage supplied to said terminals, a conventional diode in series with said semiconductor diode, and impedance means, including a capacitor and a load unit, connected in series with said diodes across said terminals.

2. Electric circuit means for producing a low frequency alternating current potential on a load unit from a supply of alternating current potential of a higher frequency, in combination, a pair of terminals energized from an alternating current supply of a selected frequency and of any selected wave shape, a series circuit including a series connected diode, a semiconductor diode having selected reversible breakdown characteristics connected in opposition to said series connected diode and having a breakdown voltage less than the voltage of the supply, and impedance means, including a capacitor and a parallel connected load unit.

3. Electric circuit means for producing a low frequency alternating current potential on a load unit from a supply of alternating current potential of a higher frequency in combination, a pair of terminals energized from an alternating current supply of a selected frequency, a series circuit connected across said terminals, said series circuit including a diode, a semiconductor diode having selected reversible breakdown characteristics connected in opposition to said first mentioned diode and having a breakdown voltage less by a selected value than the voltage of the supply, a resistor and a parallel circuit including a capacitor in one leg and a resistor unit in the other leg.

References Cited in the file of this patent

UNITED STATES PATENTS 2,467,476 Hallmark ______________ Apr. 19, 1949